(12) United States Patent
Vazquez Valdez et al.

(10) Patent No.: US 11,788,612 B1
(45) Date of Patent: Oct. 17, 2023

(54) TORQUE CONVERTER COVER TO PILOT ASSEMBLY

(71) Applicant: Schaeffler Technologies AG & Co. KG, Herzogenaurach (DE)

(72) Inventors: Jose Cruz Vazquez Valdez, Wooster, OH (US); Craig McBurney, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/722,545

(22) Filed: Apr. 18, 2022

(51) Int. Cl.
*F16H 41/28* (2006.01)
*B23K 20/00* (2006.01)
*B23K 101/00* (2006.01)

(52) U.S. Cl.
CPC ............ *F16H 41/28* (2013.01); *B23K 20/002* (2013.01); *B23K 2101/001* (2018.08)

(58) Field of Classification Search
CPC .. B23K 20/002; B23K 2101/001; F16H 41/28
See application file for complete search history.

(56) References Cited

U.S. PATENT DOCUMENTS

| 3,010,011 | A | * | 11/1961 | Darlington, Jr. | ....... | B23K 9/201 |
| | | | | | | 219/105 |
| 2020/0263773 | A1 | * | 8/2020 | Persinger | ................ | F16H 45/02 |

* cited by examiner

*Primary Examiner* — Moshe Wilensky
(74) *Attorney, Agent, or Firm* — Volpe Koenig

(57) ABSTRACT

A method of assembling a pilot to a torque converter cover is provided with the method including: (a) providing the pilot having an annular projection in a connection region; (b) forming a torque converter cover of a torque converter with a complementary recess or annular groove to the annular projection in a mating connection region; (c) positioning the pilot on the torque converter cover with the annular projection at least partially received in the complementary recess or annular groove; and (d) applying force and energy to the pilot to weld the pilot to the torque converter cover. A torque converter assembly is also provided.

20 Claims, 4 Drawing Sheets

TORQUE CONVERTER COVER TO PILOT ASSEMBLY

FIELD OF INVENTION

The disclosure relates to a welded assembly, and more particularly to a torque converter assembly, and more specifically to a torque converter that includes a pilot affixed to one axial side.

BACKGROUND

Torque converters are known that include a pilot that is welded to one axial side of the torque converter (TC) cover. In the known arrangement, the pilot 10 includes a formed or machined projection 12, for example as shown in FIG. 1, where the pilot contacts the TC cover 14, and is welded to the TC cover 14 by the application of electrical energy and force. Different types of stamped, machined and coined projections are shown in FIGS. 2-4, respectively. The welding process results in metal fusing and forming the welded connection. However, an issue has been found with the fatigue life of these assemblies due at least in part to spreading out of the weld resulting in a poorly bonded or unbonded region 16, as shown for example in FIG. 5, at the edges of the weld that form stress notches from which cracks can propagate.

It would be desirable to find a cost-effective solution to this that improves quality without increasing costs, weight or assembly time.

SUMMARY

In one aspect, a method of assembling a pilot to a torque converter cover is provided with the method including: (a) providing the pilot having an annular projection in a connection region; (b) forming a torque converter cover of a torque converter with a complementary recess or annular groove to the annular projection in a mating connection region; (c) positioning the pilot on the torque converter cover with the annular projection at least partially received in the complementary recess or annular groove; and (d) applying force and energy to the pilot to weld the pilot to the torque converter cover.

In one aspect, the complementary recess or annular groove is machined in the torque converter cover. Alternatively, the complementary recess or annular groove can be stamped or coined.

In another aspect, the complementary recess or annular groove is the annular recess and is formed with a sharp corner that the annular projection contacts prior to welding. This is effect forms a cover projection that contacts the pilot annular projection for welding, enhancing the weld bond strength and penetration.

Alternatively, for the case where the complementary recess or annular groove is the annular groove, this can be formed with two sharp corners that respective inner and outer sides of the annular projection contact prior to welding. This forms in effect two annular cover projections that contact the pilot annular projection for welding, enhancing the weld bond strength and penetration.

In another aspect, the complementary recess or annular groove has a clearance between a tip of the annular projection and a bottom of the recess or annular groove such that a space remains between the annular projection and the bottom of the recess after welding. This ensures no penetration through the TC cover in order to maintain the sealing function of the cover.

Additionally, the use of the complementary recess or annular groove limits expansion of a material of the annular projection during welding reducing the chance of a poorly bonded or unbonded region at the edge of the weld connection.

In a further aspect, a torque converter assembly is provided that includes a pilot having an annular projection in a connection region, a torque converter cover of a torque converter with a complementary recess or annular groove to the annular projection in a mating connection region, and a weld connection between the pilot and the torque converter cover in an area of the connection region and the mating connection region.

In one embodiment, the complementary recess or annular groove is machined in the torque converter cover. Alternatively, the complementary recess or annular groove is stamped or coined.

In one embodiment, the complementary recess or annular groove is the annular recess and is formed with a sharp corner that the annular projection contacts. This is effect forms a cover projection that contacts the pilot annular projection for welding, enhancing the weld bond strength and penetration.

In another embodiment, the complementary recess or annular groove is the annular groove and is formed with two sharp corners that respective inner and outer sides of the annular projection contact. This forms in effect two annular cover projections that contact the pilot annular projection for welding, enhancing the weld bond strength and penetration.

In another aspect, the complementary recess or annular groove has a clearance between a tip of the annular projection and a bottom of the recess or annular groove such that a space remains between the annular projection and the bottom of the recess after formation of the weld connection. This ensures no penetration through the TC cover in order to maintain the sealing function of the cover.

In another aspect, the complementary recess or annular groove is configured to limit expansion of a material of the annular projection during welding. This also helps to insure good weld bond strength and penetration.

In another aspect, a method of assembling a projecting part to a metal sheet or cover is provided, and incudes: (a) providing the projecting part having an annular projection in a connection region; (b) forming a metal sheet or cover with a complementary recess or annular groove to the annular projection in a mating connection region; (c) positioning the projecting part on the metal sheet or cover with the annular projection only partially received in the complementary recess or annular groove; and (d) applying force and energy to the projecting part to weld the projecting part to the metal sheet or cover.

The other features discussed above can also be applied to this broader application.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
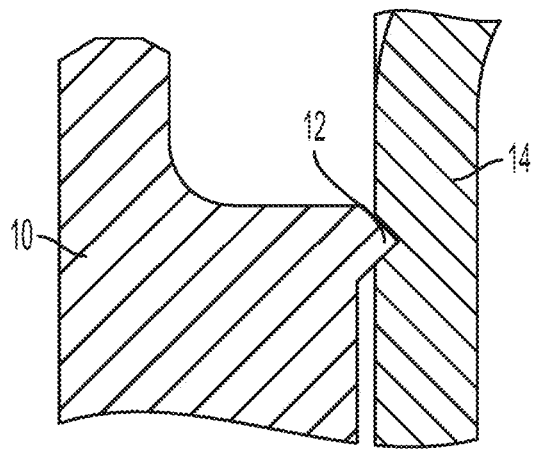
FIG. 1 is a cross-sectional view of a prior art connection between a pilot and a torque converter cover.
Figure 2:
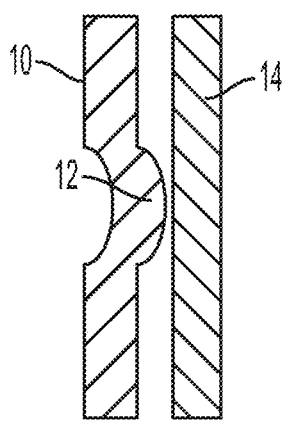
FIG. 2 is a cross-sectional view showing a stamped projection on the pilot.
Figure 3:
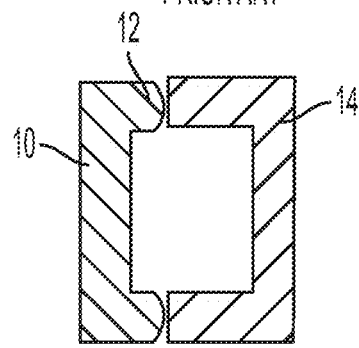
FIG. 3 is a cross-sectional view showing a machine projection on the pilot.
Figure 4:
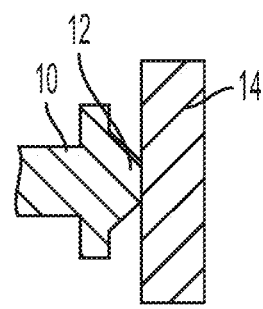
FIG. 4 is a cross-sectional view showing a coined projection on the pilot.
Figure 5:
FIG. 5 is an enlarged cross-sectional micrograph showing a prior art connection with unbonded regions at the edge of the weld that form stress notches.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Figure 7:
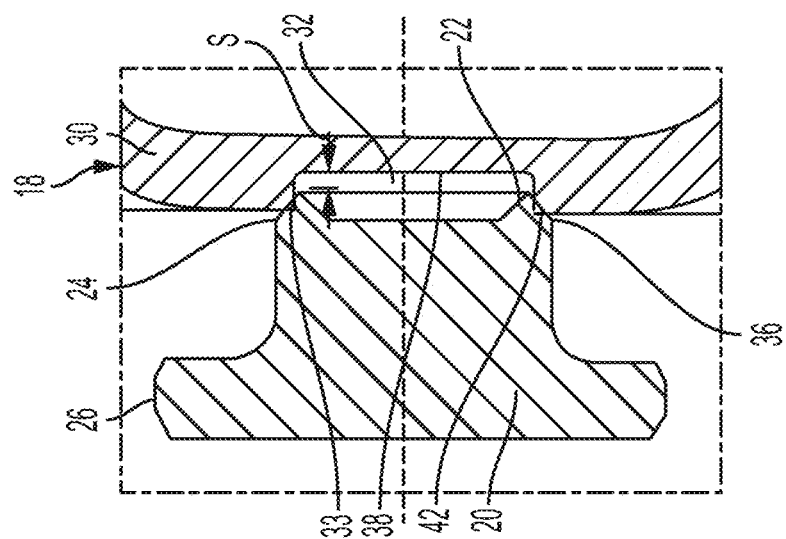
FIG. 7 is an enlarged cross-sectional view taken from the indicated area in FIG. 6.
Figure 6:
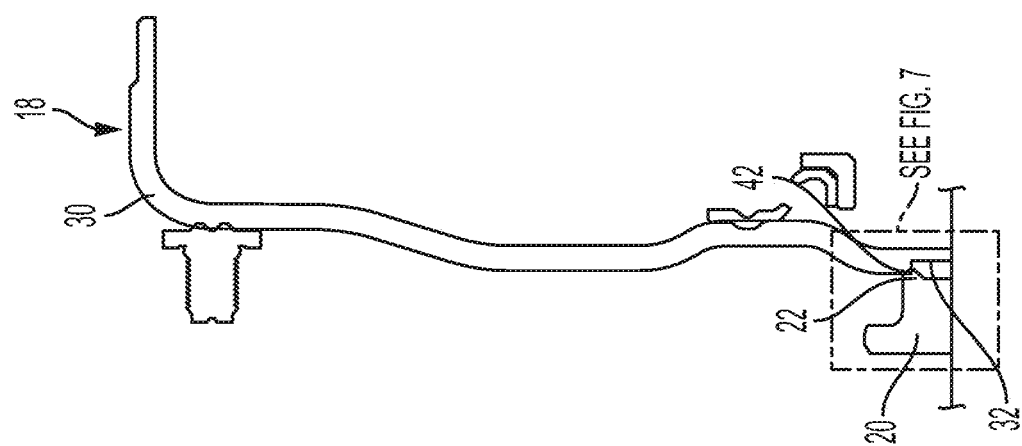
FIG. 6 is a cross-sectional view of a torque converter assembly in accordance with a first embodiment.

Referring to FIGS. 6 and 7, a first embodiment of a torque converter assembly 18, partially shown. The torque converter assembly 18 includes a pilot 20 having an annular projection 22 in a connection region 24, as well as a pilot region 26 where the pilot is adapted to be received in an opening in a shaft. A torque converter cover 30 is provided and includes a complementary recess 32 to the annular projection 22 in a mating connection region 36. A weld connection 42 is provided between the pilot 20 and the torque converter cover 30 in an area of the connection region 24 and the mating connection region 36. The complementary recess 32 can be machined in the torque converter cover 30. Alternatively, the complementary recess 32 can be stamped or coined in the torque converter cover 20.

In one embodiment, the recess 32 is formed with a sharp corner 33 at the edge of the recess 32, and the annular projection 32 contacts this sharp corner 33. This sharp corner 33 effectively forms a projection on the torque converter cover 30 which the annular projection 22 of the pilot 20 contacts. During welding, the recess 32 prevents spreading of the weld and also increases the force on the weld since the annular projection 22 is contacting this sharp corner 33 during welding. The sharp corner 33 is intended to refer to a line intersection between two surfaces at the edge of the recess 32 as well as chamfered or radiused corner of up to about 0.050 inches.

As shown in detail in FIG. 7, the complementary recess 32 has a clearance S between the tip of the projection 22 and a bottom 38 of the recess 32 such that a space remains between the annular projection 22 and the bottom 38 of the recess 32 after formation of the weld connection 42.

In the disclosed embodiment, both the torque converter cover 30 and the pilot 20 are made of a ferrous material. The assembly 18 has improved properties in comparison to the prior art based on the present weld connection 42 being formed where the annular projection 22 contacts the edge of the recess 32.

Figure 9:
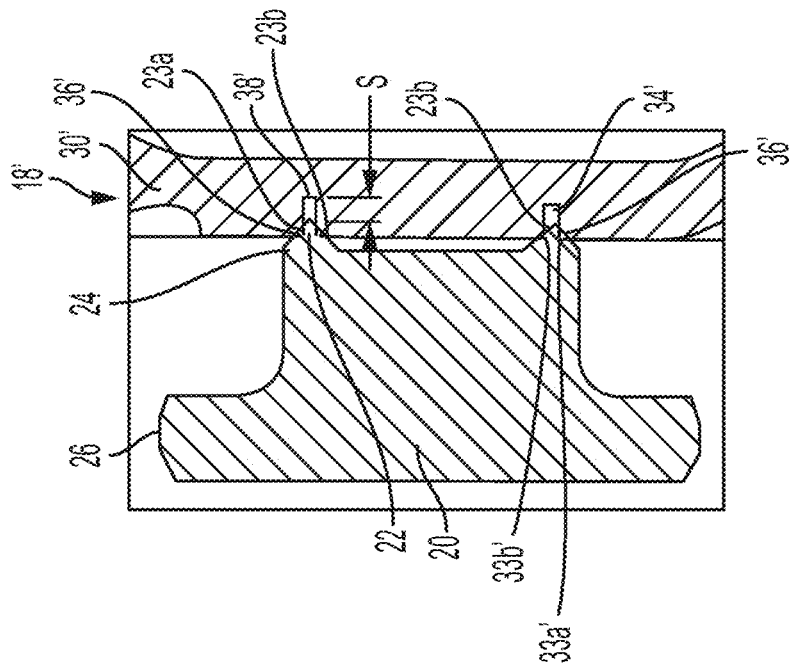
FIG. 9 is an enlarged cross-sectional view taken from the indicated area in FIG. 8.
Figure 8:
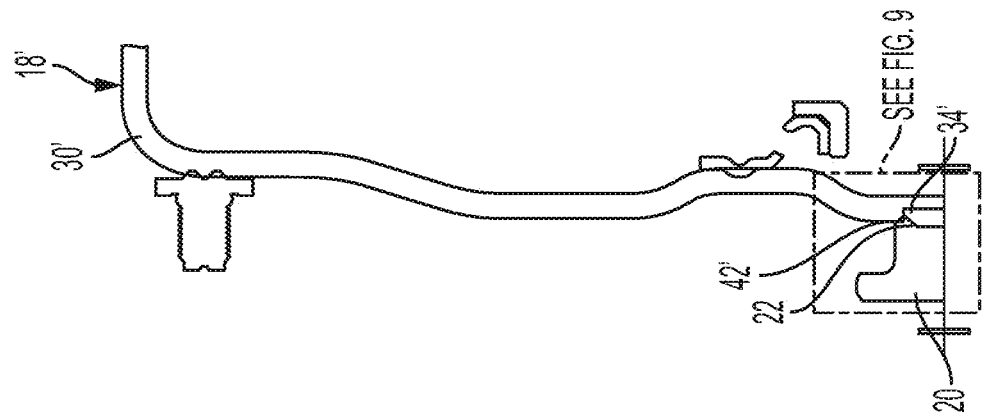
FIG. 8 is a cross-sectional view of a second embodiment of a torque converter assembly.

Referring now to FIGS. 8 and 9, a second embodiment of the torque converter 18' is shown. Here, the pilot 20 having the annular projection 22 in the connection region 24 is the same as noted above. The torque converter cover 30' is similar to the torque converter cover 30 discussed in connection with the first embodiment of the torque converter 18. However, instead of the complementary recess 32, a complementary annular groove 34' is formed in the mating connection region 36'. The weld connection 42' is provided between the pilot 20 and the torque converter cover 30' in the area of the annular connection region 24 and the mating connection region 36'. The annular groove 34' can be machined in the torque converter cover 30'. Alternatively, it can also be formed by stamping or coining in the torque converter cover 30'.

In this case, the annular groove 34' is formed with two sharp corners 33*a*', 33*b*' at the radially inner and outer edges of the groove 34', and these sharp corners 33*a*', 33*b*' contact respective outer and inner sides 23*a*, 23*b* of the annular projection 22 on the pilot 20. The sharp corners 33*a*', 33*b*' have the same meaning as the sharp corner 33 as noted above.

As shown in detail in FIG. 9, the annular groove 34' also has a clearance S between a tip of the annular projection 22 and a bottom 38' of the annular groove 34' such that a space remains between the annular projection 22 and the bottom 38' of the annular groove 34' after formation of the weld connection 42'. The annular groove 34' is also configured to limit expansion of a material of the annular projection 22 during welding. This helps maintain a higher contact force between the annular projection 22 and the sharp corners 33*a*', 33*b*' of the torque converter cover 30' formed by the annular groove 34' during welding in order to form a strong weld connection 42'.

Figure 10:
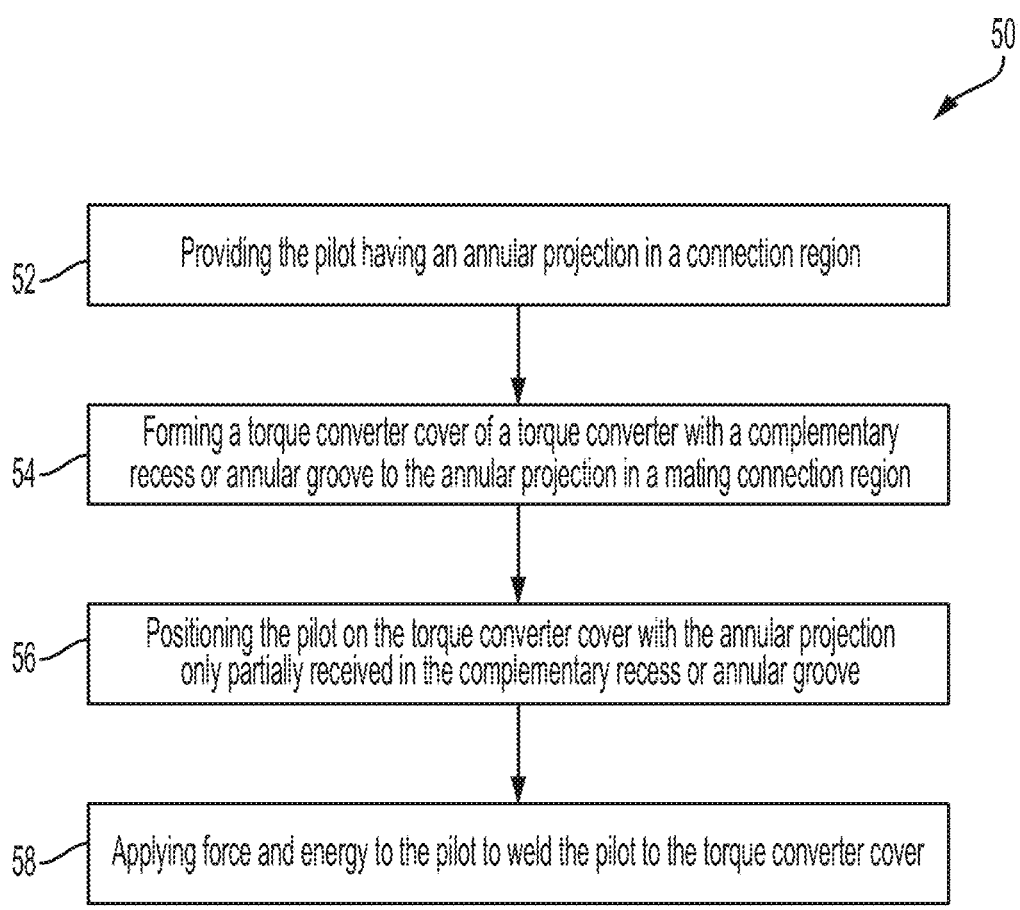
FIG. 10 is a flow chart showing a method of assembling a pilot to a torque converter cover according to the present disclosure.

Referring now to FIGS. 10, as well as FIGS. 6-9, a method 50 for assembly a pilot 20 to a torque converter cover 30, 30' is also provided. As shown at 52 in FIG. 10, the method includes providing the pilot 20 having an annular projection 22 in a connection region 24.

As shown at 54 in FIG. 10, the method further includes forming a torque converter cover 30, 30' of a torque converter with a complementary recess 32 or annular groove 34' to the annular projection 22 in a mating connection region 36, 36'.

As shown at 56 in FIG. 10, the method further includes positioning the pilot 20 on the torque converter cover 30, 30', with the annular projection 22 only partially received in the complementary recess 32 or annular groove 34'.

Finally, as shown at 58 in FIG. 10, the method includes applying force and energy to the pilot 20 to weld the pilot 20 to the torque converter cover 30, 30' using a known welding process.

Here, the complementary recess 32 or annular groove 34' is either machined in the torque converter cover 30, 30', or is stamped or coined in the torque converter cover 30, 30'.

Where the complementary recess 32 is provided in the torque converter cover 30, the method may further include forming the recess 32 with a sharp corner 33 that the annular projection 22 contacts prior to welding. If the annular groove 34' is provided in the torque converter cover 30', the method may further include forming the annular groove 34' with two sharp corners 33a', 33b' that respective inner and outer sides 23a, 23b of the annular projection 22 contact prior to welding.

In either case, the method includes providing a clearance S between a tip of the annular projection 22 and a bottom 38, 38' of the recess 32 or the annular groove 34' such that a space remains between the annular projection 22 and the bottom 38, 38' of the recess 32 or the annular groove 34' after welding. This is important in order to avoid burn-through during welding which creates an unreliable weld that is prone to failure.

Both the complementary recess 32 as well as the annular groove 34' limit expansion of a material of the annular projection 22 during welding. Limiting this expansion helps to maintain a higher contact force during welding resulting in a stronger weld bond at the weld connection 42.

It is also possible to apply this method for assembling any projecting part to a metal sheet or cover. Here the projecting part is provided with an annular projection 22 in the connection region 24 and the metal sheet or cover 30 includes a complementary recess 32 or annular groove 34' to the annular projection 22 in a mating connection region 36, 36'. The method further includes positioning the projecting part 20 on the metal sheet or cover 30, 30' with the annular projection 22 only partially received in the complementary recess 32 or annular groove 34', prior to applying force and energy to the projecting part 20 to weld the projecting part 20 to the sheet or cover 30. Other features noted above that are used in connection with the assembly of the pilot 20 to the torque converter cover 30, 30' are also applicable here.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 pilot
12 formed or machined projection
14 torque converter cover
16 unbonded region
18 torque converter assembly
20 pilot
22 annular projection
23a outer side
23b inner side
24 connection region
26 pilot region
30, 30' torque converter cover
32 complementary recess
33 sharp corner
33a', 33b' sharp corner
34' complementary annular groove
36, 36' mating connection region
38 bottom
42 weld connection
50 method
52, 54, 56, 58 method steps
S clearance distance

The invention claimed is:

1. A method of assembling a pilot to a torque converter cover, the method comprising:
   providing the pilot having an annular projection in a connection region, the annular projection having an annular outer side surface and an annular inner side surface;
   forming a torque converter cover of a torque converter with a complementary recess to the annular projection in a mating connection region;
   positioning the pilot on the torque converter cover with the annular projection only partially received in the complementary recess, such that the annular outer side surface contacts the complementary recess and the annular inner side surface is free from contact with the complementary recess; and
   applying force and energy to the pilot to weld the pilot to the torque converter cover.

2. The method of claim 1, wherein the complementary recess is machined in the torque converter cover.

3. The method of claim 1, wherein the complementary recess is stamped or coined in the torque converter cover.

4. The method of claim 1, wherein the complementary recess is formed with a sharp corner that the annular projection contacts prior to welding.

5. The method of claim 1, wherein the complementary recess is formed with a sharp corner that the annular outer side surface of the annular projection contacts prior to welding.

6. The method of claim 1, wherein the complementary recess has a clearance between a tip of the annular projection and a bottom of the recess such that a space remains between the annular projection and the bottom of the recess after welding.

7. The method of claim 1, wherein the complementary recess limits expansion of a material of the annular projection during welding.

8. A method of assembling a projecting part to a sheet or cover, the method comprising:
   providing the projecting part having an annular projection in a connection region;
   forming a sheet or cover with a complementary recess or annular groove to the annular projection in a mating connection region;
   positioning the projecting part on the sheet or cover with the annular projection only partially received in the complementary recess or annular groove; and
   applying force and energy to the projecting part to weld the projecting part to the sheet or cover;
   wherein the complementary recess or annular groove has a clearance between a tip of the annular projection and a bottom of the recess or annular groove such that a space remains between the annular projection and the bottom of the recess or annular groove after welding.

9. The method of claim 8, wherein the complementary recess or annular groove is the recess and is formed with a sharp corner that the annular projection contacts prior to welding.

10. The method of claim 8, wherein the complementary recess or annular groove is the recess and is formed with a sharp corner that an annular outer side surface of the annular projection contacts prior to welding.

11. The method of claim 8, wherein the complementary recess or annular groove is the annular groove and is formed with two sharp corners that respective inner and outer sides of the annular projection contact prior to welding.

12. The method of claim 8, wherein the complementary recess or annular groove is the annular groove and is formed with an inner sharp corner and an outer sharp corner that respective annular inner and outer side surfaces of the annular projection contact prior to welding.

13. The method of claim 8, wherein the complementary recess or annular groove limits expansion of a material of the annular projection during welding.

14. A method of assembling a pilot to a torque converter cover, the method comprising:
   providing the pilot having an annular projection in a connection region, the annular projection having an annular outer side surface and an annular inner side surface;
   forming a torque converter cover of a torque converter with a complementary annular groove to the annular projection in a mating connection region;
   positioning the pilot on the torque converter cover with the annular projection only partially received in the complementary annular groove, such that both the annular outer side surface and the annular inner side surface contact the complementary annular groove; and
   applying force and energy to the pilot to weld the pilot to the torque converter cover.

15. The method of claim 14, wherein the complementary annular groove is machined in the torque converter cover.

16. The method of claim 14, wherein the complementary annular groove is stamped or coined in the torque converter cover.

17. The method of claim 14, wherein the complementary annular groove is formed with two sharp corners that the respective annular inner and outer side surfaces of the annular projection contact prior to welding.

18. The method of claim 14, wherein the complementary annular groove is formed with an inner sharp corner and an outer sharp corner that the respective annular inner and outer side surfaces of the annular projection contact prior to welding.

19. The method of claim 14, wherein the complementary annular groove has a clearance between a tip of the annular projection and a bottom of the annular groove such that a space remains between the annular projection and the bottom of the annular groove after welding.

20. The method of claim 14, wherein the complementary annular groove limits expansion of a material of the annular projection during welding.

* * * * *